United States Patent
White et al.

(10) Patent No.: US 11,194,349 B2
(45) Date of Patent: Dec. 7, 2021

(54) AUTOMATED AUTOROTATION AND PILOT AIDING SYSTEM

(71) Applicant: Sikorsky Aircraft Corporation, Stratford, CT (US)

(72) Inventors: Matthew A. White, Milford, CT (US); Matthew T. Luszcz, Hamden, CT (US); Kevin L. Bredenbeck, Stuart, FL (US); William C. Fell, Jr., Stuart, FL (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 832 days.

(21) Appl. No.: 15/629,377

(22) Filed: Jun. 21, 2017

(65) Prior Publication Data

US 2017/0369160 A1     Dec. 28, 2017

Related U.S. Application Data

(60) Provisional application No. 62/355,099, filed on Jun. 27, 2016.

(51) Int. Cl.
| | | |
|---|---|---|
| *G05D 1/10* | (2006.01) | |
| *B64C 27/12* | (2006.01) | |
| *G05D 1/08* | (2006.01) | |
| *B64C 27/00* | (2006.01) | |
| *B64C 27/02* | (2006.01) | |

(Continued)

(52) U.S. Cl.
CPC ............ *G05D 1/106* (2019.05); *B64C 27/006* (2013.01); *B64C 27/025* (2013.01); *B64C 27/12* (2013.01); *B64C 27/57* (2013.01); *B64D 45/00* (2013.01); *B64D 45/06* (2013.01); *G05D 1/0858* (2013.01); *G05D 1/105* (2013.01); *B64D 2045/0085* (2013.01)

(58) Field of Classification Search
CPC ...... B64C 27/57; B64C 27/025; B64C 27/006
See application file for complete search history.

(56) References Cited

U.S. PATENT DOCUMENTS

| | | |
|---|---|---|
| 5,046,923 A | 9/1991 | Parsons et al. |
| 7,931,231 B2 | 4/2011 | Cherepinsky et al. |

(Continued)

FOREIGN PATENT DOCUMENTS

| | | |
|---|---|---|
| EP | 2631172 A2 | 8/2013 |
| GB | 2192163 A | 1/1988 |

(Continued)

OTHER PUBLICATIONS

Bibik, Przemyslaw et al., "Helicopter Optimal Control After Power Failure Using Comprehensive Dynamic Model", Journal of Guidance, Control and Dynamics, vol. 35, No. 4, Jul.-Aug. 2012 (9 pp.).

(Continued)

*Primary Examiner* — Richard R. Green
(74) *Attorney, Agent, or Firm* — Foley & Lardner LLP

(57) ABSTRACT

A method of automating entry of an aircraft into autorotation includes detecting a loss of engine power, analyzing a sensed height and sensed airspeed of the aircraft, determining an adjusted position of one or more control surfaces of the aircraft in response to the sensed height and sensed airspeed, and automatically moving the one or more control surfaces to the adjusted position.

15 Claims, 5 Drawing Sheets

(51) Int. Cl.
*B64C 27/57* (2006.01)
*B64D 45/00* (2006.01)
*B64D 45/06* (2006.01)

(56) References Cited

U.S. PATENT DOCUMENTS

| | | | |
|---|---|---|---|
| 7,976,310 B2 | 7/2011 | Bachelder et al. | |
| 8,651,425 B2* | 2/2014 | Mercer | B64C 27/57 |
| | | | 244/196 |
| 8,798,814 B1* | 8/2014 | Spencer, V | G08G 5/0086 |
| | | | 244/10 |
| 8,989,921 B2* | 3/2015 | Nannoni | G05D 1/0858 |
| | | | 701/1 |
| 9,193,450 B2 | 11/2015 | Worsham, II et al. | |
| 9,242,727 B1* | 1/2016 | Alvarez | B64C 27/006 |
| 2014/0027565 A1 | 1/2014 | Marvin et al. | |
| 2014/0263820 A1 | 9/2014 | Smith et al. | |
| 2018/0129226 A1* | 5/2018 | Rogers | B64C 27/57 |

FOREIGN PATENT DOCUMENTS

| | | |
|---|---|---|
| JP | 5039094 B2 | 10/2012 |
| WO | 2006076647 A2 | 7/2006 |

OTHER PUBLICATIONS

European Office Action; International Application No. 17177924.2; International Filing Date: Jun. 26, 2017; dated Aug. 13, 2018; 7 pages.

Okuno, Yoshinori et al., "Optimal Control of Helicopters Following Power Failure." Journal of Guidance, Control and Dynamics, AIAA, vol. 17, No. 1, Jan.-Feb. 1994 (6 pp.).

* cited by examiner

AUTOMATED AUTOROTATION AND PILOT AIDING SYSTEM

CROSS-REFERENCE TO RELATED APPLICATIONS

This application claims the benefit of Provisional Application Ser. No. 62/355,099, filed Jun. 27, 2016, which is incorporated herein by reference in its entirety.

BACKGROUND OF THE INVENTION

The subject matter disclosed herein relates to a rotary wing aircraft, and more particularly, operation of a rotary wing aircraft in autorotation in the event of a loss of engine power.

Traditionally, autorotation occurs when a pilot detects an engine failure of a rotary wing aircraft and then takes subsequent action to preserve the rotation of the main rotor to allow for a controlled rate of descent and maintain sufficient rotor kinetic energy to slow the rate of descent prior to landing. Examples of such pilot actions include reducing the collective pitch and manipulation of the cyclic. However, the appropriate adjustments needed to maintain rotor speed and adjust forward speed for maximum efficiency will vary based on the aircraft dynamics and the flight conditions. Previous rotorcraft systems have used engine data and rotor speed measurements to provide warnings to assist a flight crew in recognizing an engine failure condition and the need for autorotation. However, due to the time-sensitive nature of autorotation, significant room for improvement remains in the field of flight control systems for a rotary wing aircraft.

BRIEF DESCRIPTION OF THE INVENTION

According to one embodiment of the invention, a method of automating entry of an aircraft into autorotation includes detecting a loss of engine power, analyzing a sensed height and sensed airspeed of the aircraft, determining an adjusted position of one or more control surfaces of the aircraft in response to the sensed height and sensed airspeed, and automatically moving the one or more control surfaces to the adjusted position.

In addition to one or more of the features described above, or as an alternative, further embodiments the adjusted position of the one or more control surfaces is selected to minimize a loss of rotor speed of a main rotor system of the aircraft.

In addition to one or more of the features described above, or as an alternative, further embodiments an autorotation system of the aircraft analyzes the sensed height and sensed airspeed of the aircraft.

In addition to one or more of the features described above, or as an alternative, further embodiments a signal indicated the loss of engine power is provided directly to the autorotation system.

In addition to one or more of the features described above, or as an alternative, further embodiments the autorotation system is configured to communicate with a flight control computer to move the one or more control surfaces to the adjusted position.

In addition to one or more of the features described above, or as an alternative, further embodiments analyzing the sensed height and sensed airspeed of the aircraft includes comparing the sensed height and sensed airspeed to a height-airspeed graph to determine which region of the graph the sensed height and sensed airspeed is within.

In addition to one or more of the features described above, or as an alternative, further embodiments the adjusted position of the one or more control surfaces varies based on the region of the graph within which the sensed height and sensed airspeed is located.

In addition to one or more of the features described above, or as an alternative, further embodiments automatically moving the one or more control surfaces includes adjusting a pitch of a main rotor system of the aircraft.

In addition to one or more of the features described above, or as an alternative, further embodiments comprising slowing minimizing a rate of descent of the aircraft at touchdown to cushion a landing of the aircraft.

In addition to one or more of the features described above, or as an alternative, further embodiments the rate of descent if controlled using the available collective and rotor rpm.

According to another embodiment, a flight control system of an aircraft includes an autorotation system configured to automatically determine an adjusted position of one or more control surfaces in response to a sensed airspeed of the aircraft and a sensed height of the aircraft. A flight control computer is operably coupled to autorotation system. The flight control computer is configured to command movement of the one or more control surfaces of the aircraft to the adjusted position.

In addition to one or more of the features described above, or as an alternative, further embodiments the autorotation system is integrated with the flight control computer.

In addition to one or more of the features described above, or as an alternative, further embodiments the adjusted position of the one or more control surfaces minimizes a loss of rotor speed of a main rotor system of the aircraft.

In addition to one or more of the features described above, or as an alternative, further embodiments the flight control computer is configured to communicate a signal to the autorotation system indicating the occurrence of a loss of engine power.

In addition to one or more of the features described above, or as an alternative, further embodiments the flight control system further comprises an engine control unit operably coupled to the autorotation system. The engine control unit is configured to communicate a signal to the autorotation system indicating the occurrence of a loss of engine power.

In addition to one or more of the features described above, or as an alternative, further embodiments the autorotation system is configured to compare the sensed airspeed of the aircraft and the sensed height of the aircraft to a height-velocity graph for the aircraft.

In addition to one or more of the features described above, or as an alternative, further embodiments the height-velocity graph for the aircraft is stored within a memory accessible by the autorotation system.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
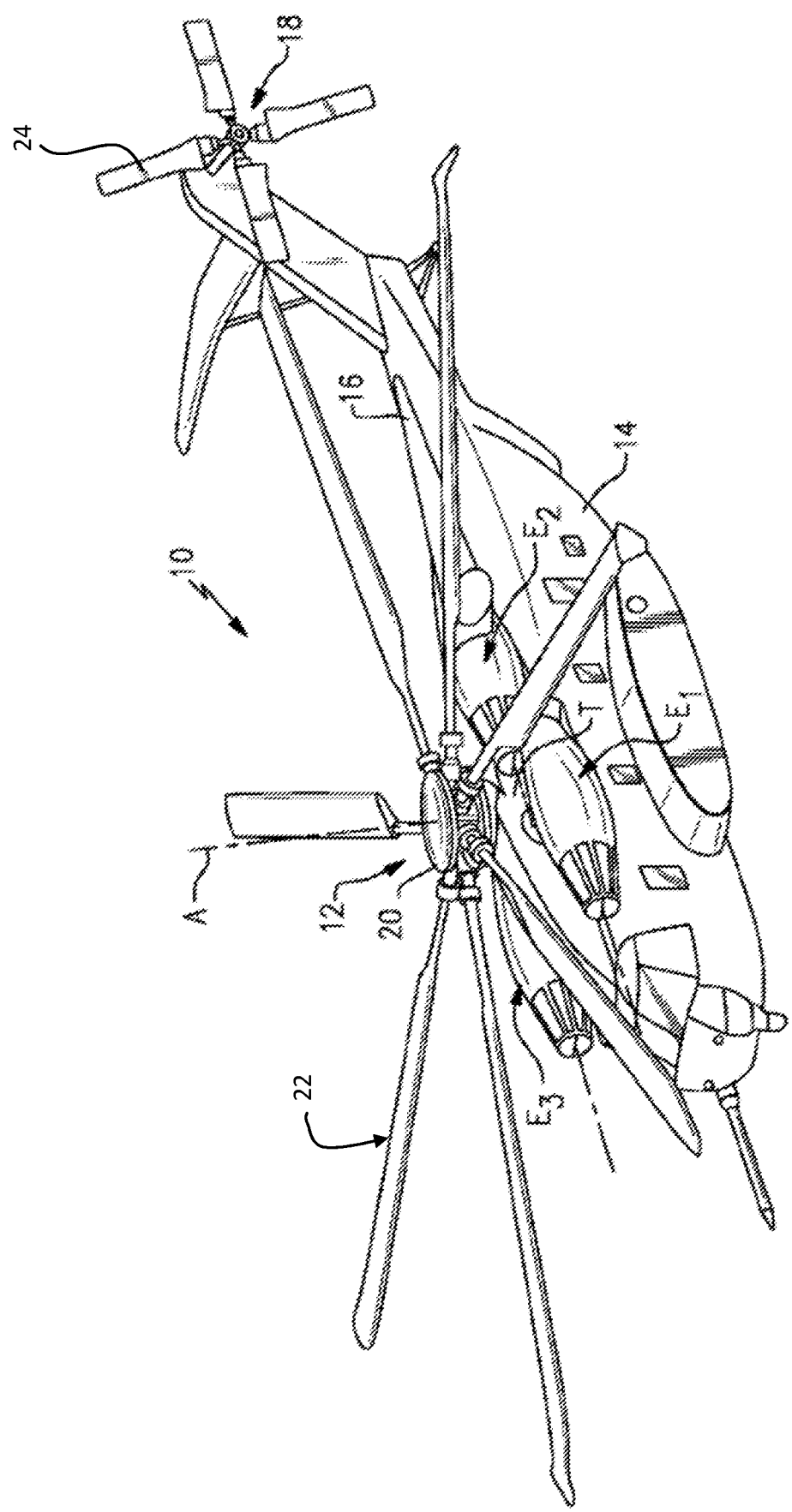
FIG. 1 is a perspective view of an example of a rotary wing aircraft.

FIG. 1 schematically illustrates an example of a rotary wing aircraft 10 having a main rotor assembly 12. The aircraft 10 includes an airframe 14 having an extending tail 16 which mounts a tail rotor system 18, such as an antitorque system, a translational thrust system, a pusher propeller, a rotor propulsion system, and the like. The main rotor assembly 12 includes a plurality of rotor blade assemblies 22 mounted to a rotor hub 20. The main rotor assembly 12 is driven about an axis of rotation A through a main gearbox (illustrated schematically at T) by one or more engines E. Although a particular helicopter configuration is illustrated and described in the disclosed embodiment, other configurations and/or machines, such as high speed compound rotary wing aircraft with supplemental translational thrust systems, dual contra-rotating, coaxial rotor system aircraft, tilt-rotors and tilt-wing aircraft, and fixed wing aircraft, will also benefit from embodiments of the invention.

Figure 2:
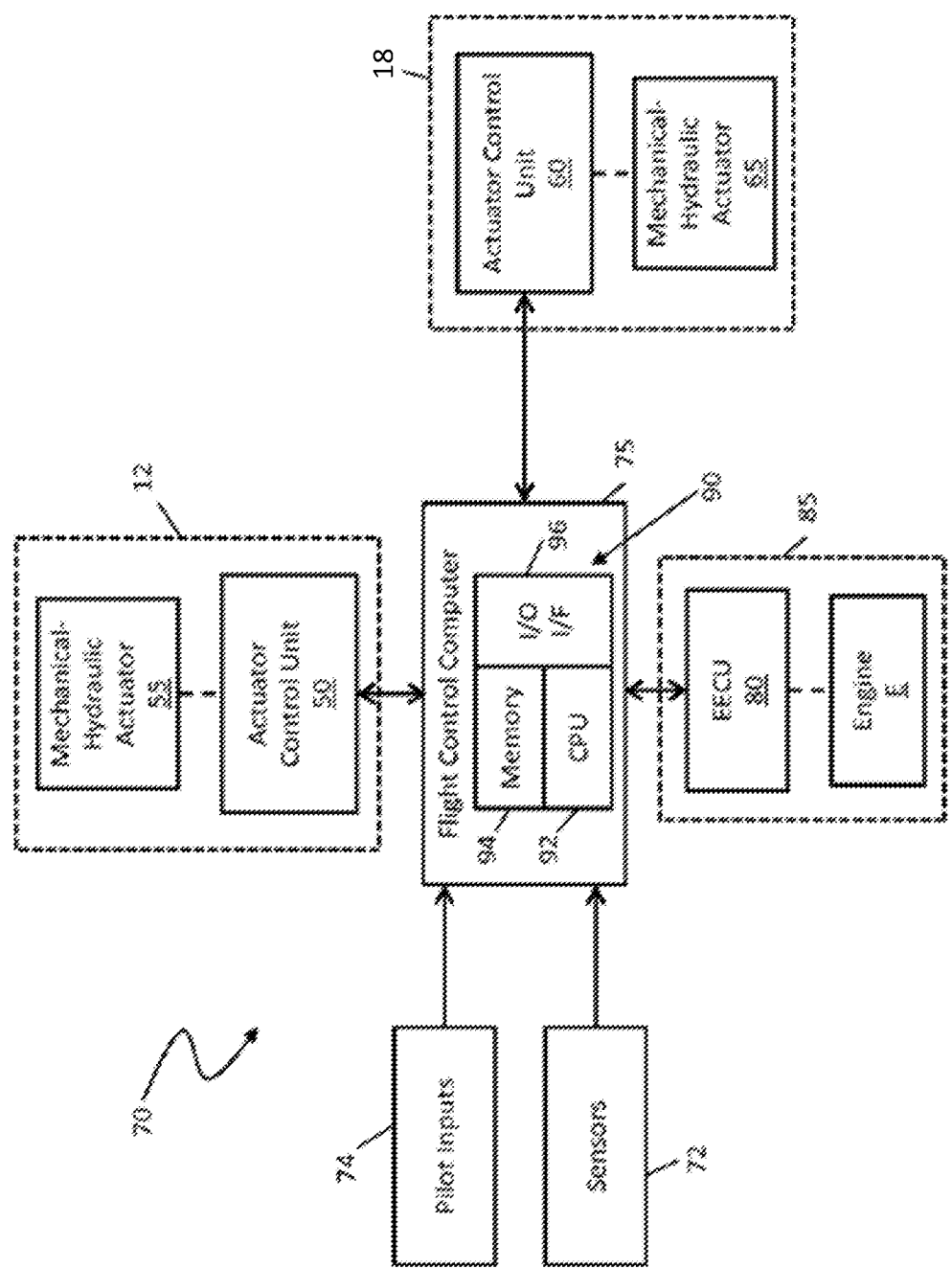
FIG. 2 is a schematic diagram of a flight control system of an aircraft.

Portions of the aircraft 10, such as the main rotor system 12 and the tail rotor system 18 for example, are driven by a flight control system 70 illustrated in FIG. 2. In one embodiment, the flight control system 70 is a fly-by-wire (FBW) control system. In a FBW control system, there is no direct mechanical coupling between a pilot's controls and movable components or control surfaces, such as rotor blade assemblies 20 or propeller blades 24 for example, of the aircraft 10 of FIG. 1. Instead of using mechanical linkages, a FBM control system includes a plurality of sensors 72 which can sense the position of controlled elements and generate electrical signals proportional to the sensed position. The sensors 72 may also be used directly and indirectly to provide a variety of aircraft state data to a flight control computer (FCC) 75. The FCC 75 may also receive pilot inputs 74 as control commands to control the lift, propulsive thrust, yaw, pitch, and roll forces and moments of the various control surfaces of the aircraft 10.

In response to inputs from the sensors 72 and pilot inputs 74, the FCC 75 transmits signals to various subsystems of the aircraft 10, such as the main rotor system 12 and the tail rotor system 18. The FCC 75 can use reference values in the pilot inputs 74 for feed forward control to quickly respond to changes in the reference values and can perform feedback control to reject disturbances detected via the sensors 72. Pilot inputs 74 can be in the form of stick commands and/or beeper commands to set and incrementally adjust reference values for controllers. The pilot inputs 74 need not be directly provided by a human pilot, but may be driven by an automatic pilot, a remote control, a navigation-based control, or one or more outer control loops configured to produce one or more values used to pilot the aircraft 10.

The main rotor system 12 can include an actuator control unit 50 configured to receive commands from the FCC 75 to control one or more actuators 55, such as a mechanical-hydraulic actuator, for the rotor blade assemblies 20 of FIGS. 1 and 2. In an embodiment, pilot inputs 74 including cyclic and/or collective commands may result in the actuator control unit 50 driving the one or more actuators 55 to adjust a swashplate assembly to control the rotor blade assemblies 20 of FIG. 1. Alternatively, the FCC 75 can directly control the one or more actuators 55, and the actuator control unit 50 can be omitted.

The tail rotor system 18 can include an actuator control unit 60 configured to receive commands from the FCC 75 to control one or more actuators 65, such as a mechanical-hydraulic actuator, associated with one or more propeller blades 24. In an embodiment, pilot inputs 74 include a propeller pitch command for the actuator control unit 60 to drive the one or more actuators 65 for controlling the propeller blades FIG. 1. Alternatively, the FCC 75 can directly control the one or more actuators 65, and the actuator control unit 60 can be omitted.

The FCC 75 can also interface with an engine control system 85 including one or more electronic engine control units (EECUs) 80 to control the engines E. Each EECU 80 may be a digital electronic control unit such as Full Authority Digital Engine Control (FADEC) electronically interconnected to a corresponding engine E. Each engine F may include one or more instances of the EECU 80 to control engine output and performance. Engines F may be commanded in response to the pilot inputs 74, such as a throttle command.

Rather than simply passing pilot inputs 74 through to various control units 50, 60, and 80, the FCC 75 includes a processing system 90 that applies models and control laws to augment commands. The processing system 90 includes processing circuitry 92, memory 94, and an input/output (I/O) interface 96. The processing circuitry 92 can be any type or combination of computer processors, such as a microprocessor, microcontroller, digital signal processor, application specific integrated circuit, programmable logic device, and/or field programmable gate array, and is generally referred to as central processing unit (CPU) 92. The memory 94 can include volatile and non-volatile memory, such as random access memory (RAM), read only memory (ROM), or other electronic, optical, magnetic, or any other computer readable storage medium onto which data and control logic as described herein are stored. Therefore, the memory 94 is a tangible storage medium where instructions executable by the processing circuitry 92 are embodied in a non-transitory form. The I/O interface 96 can include a variety of input interfaces, output interfaces, communication interfaces and support circuitry to acquire data from the sensors 72, pilot inputs 74, and other sources (not depicted) and may communicate with the control units 50, 60, 80, and other subsystems (not depicted).

Figure 3:
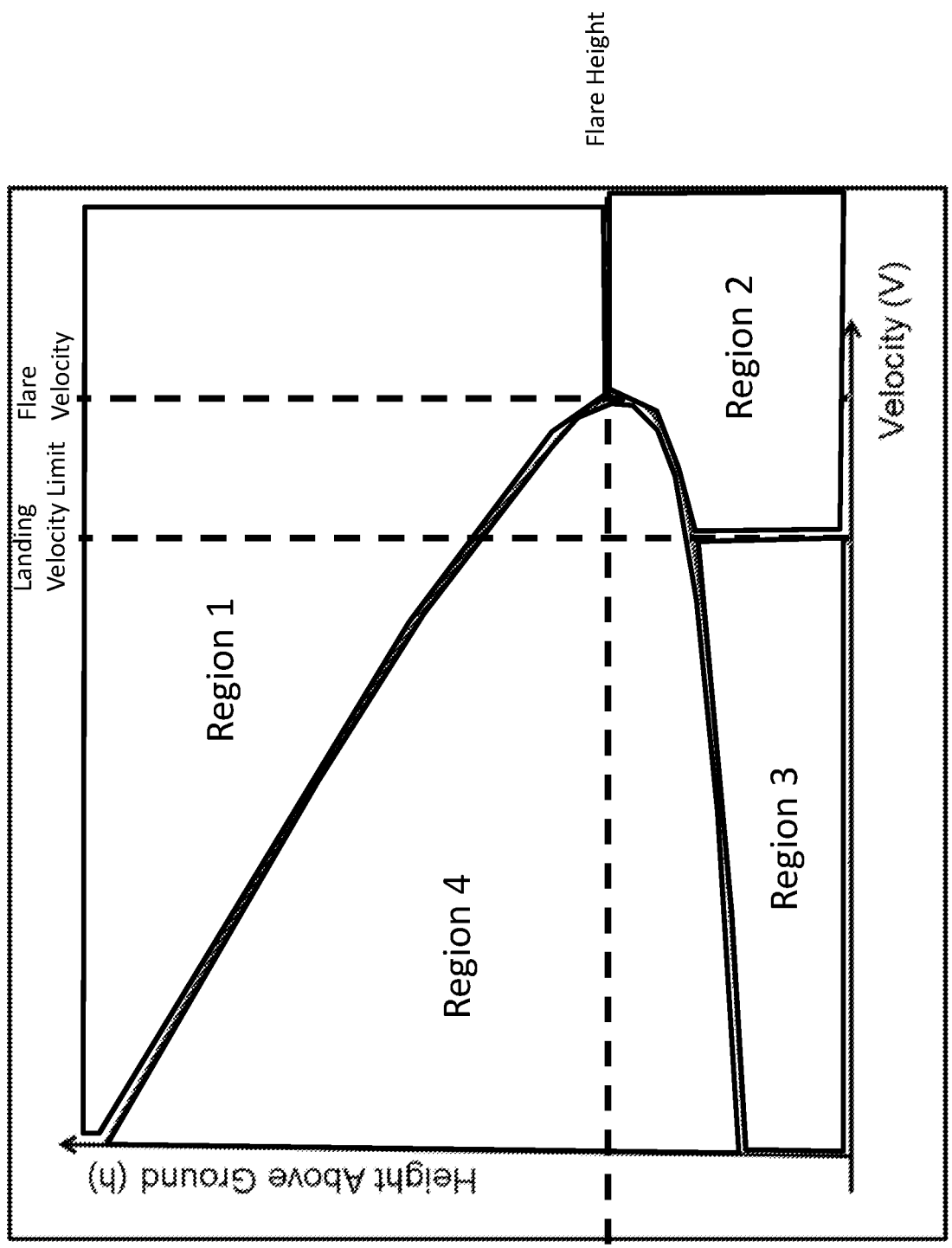
FIG. 3 is an example of a graph comparing height above ground and airspeed for an aircraft.

In the event of an engine failure, autorotation may be used to gradually descend and safely land the aircraft 10. Autorotation is a flight condition where rotation of the main rotor system 12 about its axis is driven by an air flow. This air flow is generally a result of the downward motion of an aircraft, such as typically occurs after engine failure. Alternatively, the air flow used for autorotation may be created by balancing airspeed and altitude as a form of energy management. FIG. 3 is a height-velocity curve indicating the safe and unsafe flight profiles for a specific aircraft. The shaded area indicates combinations of height above ground and airspeed of an aircraft that should be avoided, because it may be difficult or even impossible for a pilot to complete an emergency autorotation maneuver from a starting point within these regions.

Figure 4:
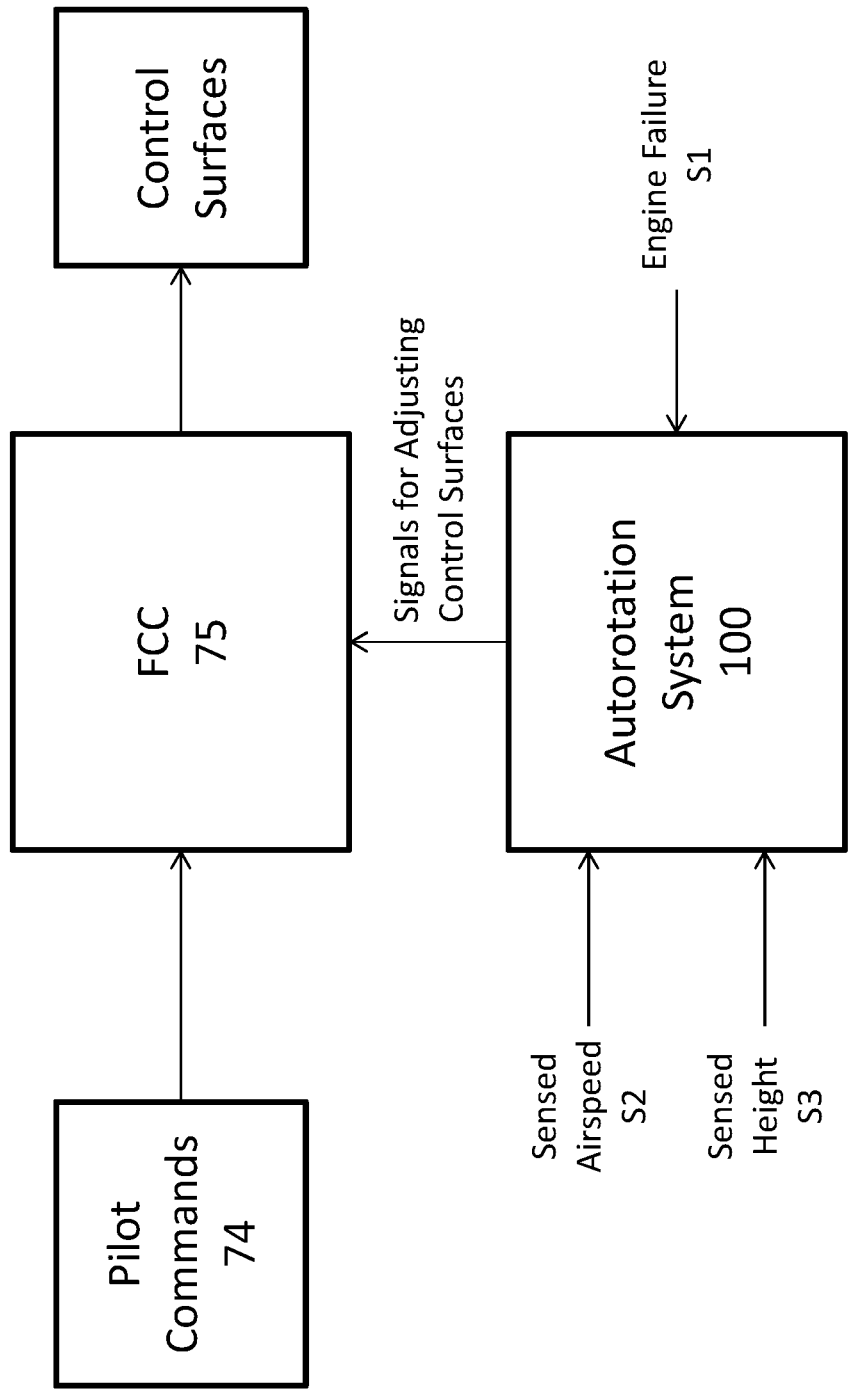
FIG. 4 is a schematic diagram of an autorotation system according to an embodiment.

With reference now to FIG. 4, the flight control system 70 includes an autorotation system 100 configured to automatically and instantaneously transition the aircraft 10 into autorotation upon detection of a loss of engine power. The autorotation system 100 provides a mechanism to assist a pilot or flight crew of the aircraft 10 in maintaining rotor speed following a loss of engine power. The autorotation system 100 can manipulate the position of the one or more control surfaces of the aircraft 10 to prevent loss of rotor speed faster and more effectively than the flight crew. In an embodiment, the autorotation system 100 is configured to manage one or more flight parameters including, but not limited to altitude, rotor speed, flare speed (when the aircraft is above a flare height), landing speed, pitch attitude and descent rate of the aircraft. For example, the autorotation system 100 may manage the landing speed by reducing the speed for final touchdown of the aircraft 10, or the autorotation system 100 may manage the pitch attitude by enforcing limits as the speed of the aircraft is varied or by landing tail first to avoid a ground loop.

As shown in FIG. 4, the flight control computer 75 is configured to cooperate with the autorotation system 100. Although the autorotation system 100 is illustrated as being separate from the flight control computer 75, embodiments where the autorotation system 100 is integrated within the flight control computer 75 are also contemplated herein. The autorotation system 100 is typically inactive or dormant until the system 100 receives a signal S1 indicating a loss of engine power. The signal S1 indicating a loss of engine power may be communicated to the autorotation system 100 via the FCC 75, or alternatively, may be communicated directly thereto from a portion of an engine control system 85, such as an engine control unit 80 for example.

Upon detection of a loss of engine power, the autorotation system 100 will determine an adjusted position of one or more control surfaces of the aircraft 10 to minimize a loss of rotor energy. The autorotation system 100 is configured to tailor the control response, such as the when and how to adjust the pitch of the aircraft 10 and when to initiate flaring for example, based on measured flight conditions. In an embodiment, the autorotation system 100 is configured to optimize the operation of the aircraft 10 in autorotation in response to a measured airspeed or velocity S2 of the aircraft 10 and a sensed height S3 of the aircraft 10 above the ground. The autorotation system 100 may compare the sensed airspeed and height to a height-velocity graph for the aircraft 10, such as stored within a memory or database for example.

The control provided by the autorotation system 100 is dependent on the position of the sensed height and velocity of the aircraft when plotted on the graph. The plotted height and velocity fall within one of four regions on the graph. In a first region, the sensed height of the aircraft is above a flare height and the sensed velocity of the aircraft is at any speed. The plotted point is within a second region when the sensed height is less than the flare height, but the sensed velocity of the aircraft is greater than the landing velocity limit. Points within the third region indicate that the aircraft has a sensed height less than the flare height and a sensed velocity less than or equal to the landing velocity limit. In the fourth region, the plotted height and velocity is located to the left of the curve of the height-velocity graph.

Depending on the region within which the height and airspeed falls, the one or more commands, such as to control the cyclic or collective pitch of the main rotor for example, communicated to the FCC 75 for implementation by one or more actuators to move a corresponding control surface will vary. When the height and airspeed falls within any of the first, second, and third regions, the autorotation system 100 takes over operational control of the aircraft. During such operation of the autorotation system 100, the pilot may provide directional commands to the flight control system 70. In embodiments where the plotted height and airspeed falls within the fourth region, the autorotation system may operate to minimize the impact of the aircraft as it approaches the ground. Alternatively, if the plotted height and airspeed falls within the fourth region, the autorotation system may be configured to leave all operational control to the flight crew.

Regardless of which region the sensed height and airspeed fall within, the pilot of the aircraft 10 may be able to manually override the autorotation system 100 and provide control inputs to the flight control computer 75 for any axis. For example, the autorotation system 100 is configured to manage the energy of the aircraft without awareness to other flight variables, such as obstacles or suitable landing areas. Because of this, it may be desirable for a pilot to override or supplement the optimized operation as determined by the autorotation system 100, to reach a desired landing zone.

In an embodiment, the autorotation system 100 is configured to control operation of the aircraft 10 until the aircraft is landed and on the ground. For example, during landing, the autorotation system 100 may be configured to minimize the rate of descent at touchdown by using the available collective and rotor rpm to cushion the landing of the aircraft 10.

Figure 5:
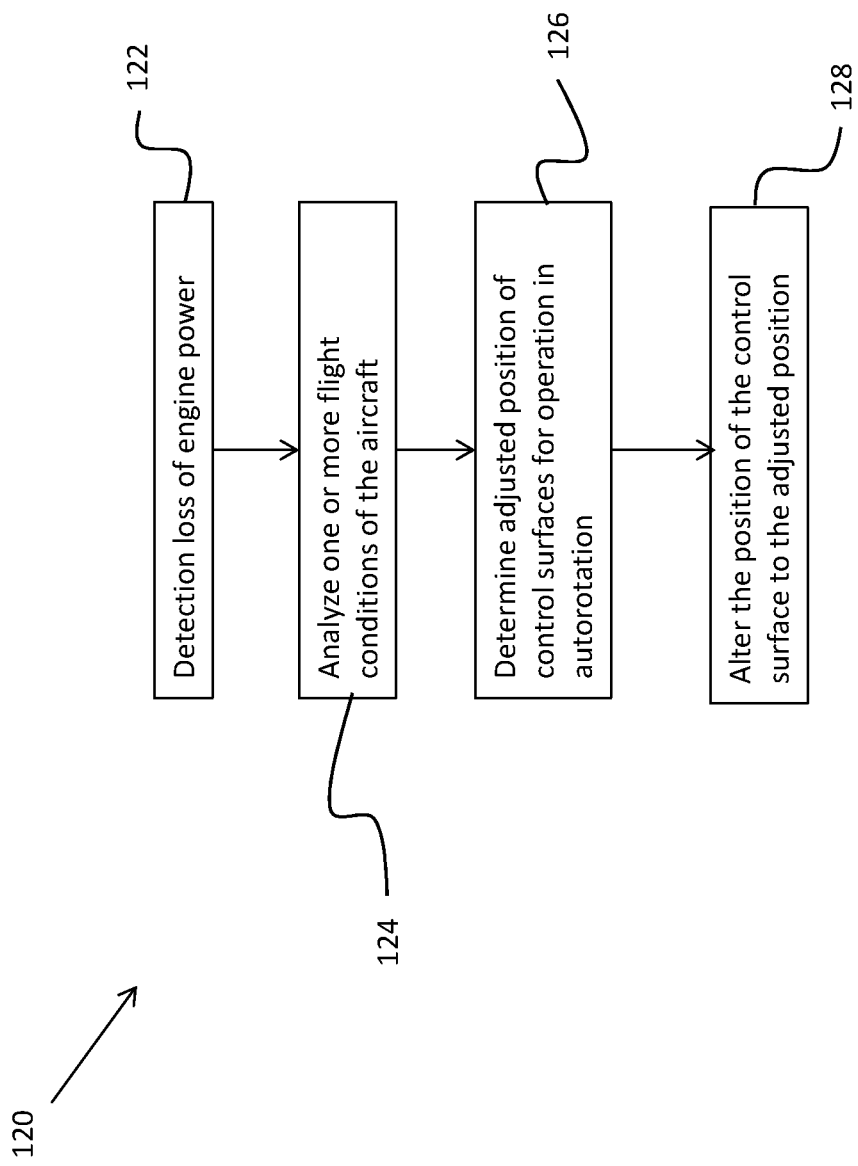
FIG. 5 is a schematic diagram indicating a method of automated entry of an aircraft into autorotation according to an embodiment.

Referring now to FIG. 5, a method 120 for automated entry of an aircraft into autorotation is illustrated schematically. As shown in block 122, the method includes detection and/or confirmation of a loss of engine power. In embodiments where the aircraft 10 has a single engine E, detection of the loss of engine power includes configured the loss of power of the single engine. In embodiments where the aircraft 10 includes a plurality of engines E, detection of the loss of engine power includes detecting a power loss at each of the plurality of engines. The method further includes analyzing one or more flight conditions of the aircraft, shown in block 124. Analyzing one or more flight conditions includes comparing a sensed height and airspeed to a height-velocity curve of the aircraft. Upon determining the position of the sensed height and airspeed, as shown in block 126, the autorotation system identifies a corresponding region of the height-velocity graph and an adjusted position of one or more control surfaces to optimize autorotation and rotor energy of the aircraft 10. In block 128, the one or more control surfaces are moved to the adjusted position at the time identified by the autorotation system 100.

Automatically generating commands based on the current condition of an aircraft 10 and directly implementing those commands at the one or more control surfaces of the aircraft 10 increases the efficiency of operation in autorotation. By eliminating pilot delay, the autorotation system reduces the time required to get to the desired flare velocity when above the flare height, thereby preserving the rotor speed necessary to achieve autorotation. Further, use of an algorithm to implement the necessary control response ensures that response provided is fully repeatable and is effective at managing the rotor speed, airspeed, and the descent rate of the aircraft 10 until the aircraft 10 is landed on the ground.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method of automating entry of an aircraft into autorotation comprising:
   detecting a loss of engine power;
   analyzing a sensed height and sensed airspeed of the aircraft;
   identifying a region of a height-airspeed graph within which the aircraft is operating using the sensed height and the sensed airspeed, the height-airspeed graph having four regions including (i) a first region defined by a height above a flare height, (ii) a second region defined by the height below the flare height and airspeed greater than a landing velocity limit, (iii) a third region defined by the height below the flare height and the airspeed less than or equal to the landing velocity limit, and (iv) a fourth region defined between a height axis and the first region, the second region and the third region;
   determining an adjusted position of one or more control surfaces of the aircraft in response to the identified region of aircraft operation corresponding to one of the first region, the second region, the third region, or the fourth region of the height-airspeed graph; and
   automatically moving the one or more control surfaces to the adjusted position.

2. The method according to claim 1, wherein the adjusted position of the one or more control surfaces is selected to minimize a loss of rotor speed of a main rotor system of the aircraft.

3. The method according to claim 1, wherein an autorotation system of the aircraft analyzes the sensed height and sensed airspeed of the aircraft.

4. The method according to claim 3, wherein a signal indicating the loss of engine power is provided directly to the autorotation system.

5. The method according to claim 3, wherein the autorotation system is configured to communicate with a flight control computer to move the one or more control surfaces to the adjusted position.

6. The method according to claim 1, wherein the adjusted position of the one or more control surfaces varies based on the region of the height-airspeed graph within which the aircraft is operating.

7. The method according to claim 1, wherein automatically moving the one or more control surfaces includes adjusting a pitch of a main rotor system of the aircraft.

8. The method according to claim 1, further comprising minimizing a rate of descent of the aircraft at touchdown to cushion a landing of the aircraft.

9. The method according to claim 8, wherein the rate of descent is controlled using an available collective and rotor rpm.

10. A flight control system of an aircraft comprising:
    an autorotation system configured to identify a region of operation the aircraft relative to a height-airspeed graph using a sensed airspeed of the aircraft and a sensed height of the aircraft and automatically determine an adjusted position of one or more control surfaces in response to the identified region, the height-airspeed graph having four regions including (i) a first region defined by a height above a flare height, (ii) a second region defined by the height below the flare height and airspeed greater than a landing velocity limit, (iii) a third region defined by the height below the flare height and the airspeed less than or equal to the landing velocity limit, and (iv) a fourth region defined between a height axis and the first region, the second region and the third region; and
    a flight control computer operably coupled to autorotation system, the flight control computer being configured to command movement of the one or more control surfaces of the aircraft to the adjusted position.

11. The system according to claim 10, wherein the autorotation system is integrated with the flight control computer.

12. The system according to claim 10, wherein the adjusted position of the one or more control surfaces minimizes a loss of rotor speed of a main rotor system of the aircraft.

13. The system according to claim 10, wherein the flight control computer is configured to communicate a signal to the autorotation system indicating the occurrence of a loss of engine power.

14. The system according to claim 10, wherein the flight control system further comprises an engine control unit operably coupled to the autorotation system, the engine control unit being configured to communicate a signal to the autorotation system indicating the occurrence of a loss of engine power.

15. The system according to claim 10, wherein the height-airspeed graph for the aircraft is stored within a memory accessible by the autorotation system.

* * * * *